(12) United States Patent
Nayak et al.

(10) Patent No.: US 10,254,820 B2
(45) Date of Patent: Apr. 9, 2019

(54) CONFIGURABLE AND POWER-OPTIMIZED INTEGRATED GATE-DRIVER FOR USB POWER-DELIVERY AND TYPE-C SOCS

(71) Applicant: Cypress Semiconductor Corporation, San Jose, CA (US)

(72) Inventors: Anup Nayak, Fremont, CA (US); Ramakrishna Venigalla, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 24 days.

(21) Appl. No.: 15/648,036

(22) Filed: Jul. 12, 2017

(65) Prior Publication Data

US 2017/0351320 A1  Dec. 7, 2017

Related U.S. Application Data

(63) Continuation of application No. 15/200,538, filed on Jul. 1, 2016, now Pat. No. 9,727,123.

(60) Provisional application No. 62/336,183, filed on May 13, 2016.

(51) Int. Cl.
| | |
|---|---|
| *G06F 9/00* | (2006.01) |
| *H01L 29/76* | (2006.01) |
| *H01L 29/772* | (2006.01) |
| *G06F 1/3287* | (2019.01) |
| *G06F 13/38* | (2006.01) |
| *G06F 13/42* | (2006.01) |

(Continued)

(52) U.S. Cl.
CPC ............ *G06F 1/3287* (2013.01); *G06F 1/266* (2013.01); *G06F 13/385* (2013.01); *G06F 13/4072* (2013.01); *G06F 13/4282* (2013.01); *G06F 2213/0042* (2013.01); *Y02D 10/14* (2018.01); *Y02D 10/151* (2018.01)

(58) Field of Classification Search
CPC ... G06F 1/3287; G06F 13/385; G06F 13/4282
See application file for complete search history.

(56) References Cited

U.S. PATENT DOCUMENTS

| | | |
|---|---|---|
| 5,265,003 A | 11/1993 | Kayser et al. |
| 5,654,895 A | 8/1997 | Bach et al. |
| 5,828,262 A | 10/1998 | Rees |

(Continued)

FOREIGN PATENT DOCUMENTS

| | | |
|---|---|---|
| CN | 101944901 A | 1/2011 |
| CN | 104467796 A | 3/2015 |

OTHER PUBLICATIONS

Abdus Sattar, et al., "P-channel Power MOSFETs Approach N-Channel Performance," Power Electronics Technology, dated May 2009; 4 pages.

(Continued)

*Primary Examiner* — Mark A Connolly

(57) ABSTRACT

Techniques for power Field Effect Transistor (power-FET) gate drivers are described herein. In an example embodiment, a USB-enabled system comprises a first and second power paths and an IC controller coupled to control the first and second power paths, where the first and second power paths are external to the IC controller and the IC controller is configured to operate both an N-channel power-FET in the first power path and a P-channel power-FET in the second power path.

7 Claims, 9 Drawing Sheets

(51) Int. Cl.
    *G06F 1/26*         (2006.01)
    *G06F 13/40*       (2006.01)

(56) References Cited

U.S. PATENT DOCUMENTS

| | | | |
|---|---|---|---|
| 6,163,169 A * | 12/2000 | Lawson | H03K 17/164 |
| | | | 326/57 |
| 6,835,638 B1 | 12/2004 | Forbes et al. | |
| 7,859,302 B2 | 12/2010 | Balasubramanian et al. | |
| 7,898,009 B2 | 3/2011 | Wilson et al. | |
| 8,138,795 B2 | 3/2012 | Hseih et al. | |
| 2003/0164721 A1 | 9/2003 | Reichard | |
| 2006/0220675 A1 | 10/2006 | Tripathi et al. | |
| 2007/0279096 A1 | 12/2007 | Chong et al. | |
| 2010/0271102 A1 | 10/2010 | Azetsuji | |
| 2013/0073776 A1 | 3/2013 | Johnson | |
| 2013/0136224 A1 | 5/2013 | Qing et al. | |
| 2013/0328852 A1 | 12/2013 | Jamal et al. | |
| 2014/0208134 A1 | 7/2014 | Waters et al. | |
| 2016/0092393 A1 | 3/2016 | Nge et al. | |

OTHER PUBLICATIONS

International Search Report for International Application No. PCT/US2017/017816 dated May 10, 2017; 2 pages.
USPTO Notice of Allowance for U.S. Appl. No. 15/200,538 dated Mar. 22, 2017; 5 pages.
USPTO Notice of Allowance for U.S. Appl. No. 15/200,538 dated Dec. 12, 2016; 7 pages.
Written Opinion of the International Searching Authority for International Application No. PCT/US2017/017816 dated May 10, 2017; 6 pages.
SIPO Office Action for International Application 2017102081172 dated Dec. 5, 2018, 7 pages.

\* cited by examiner

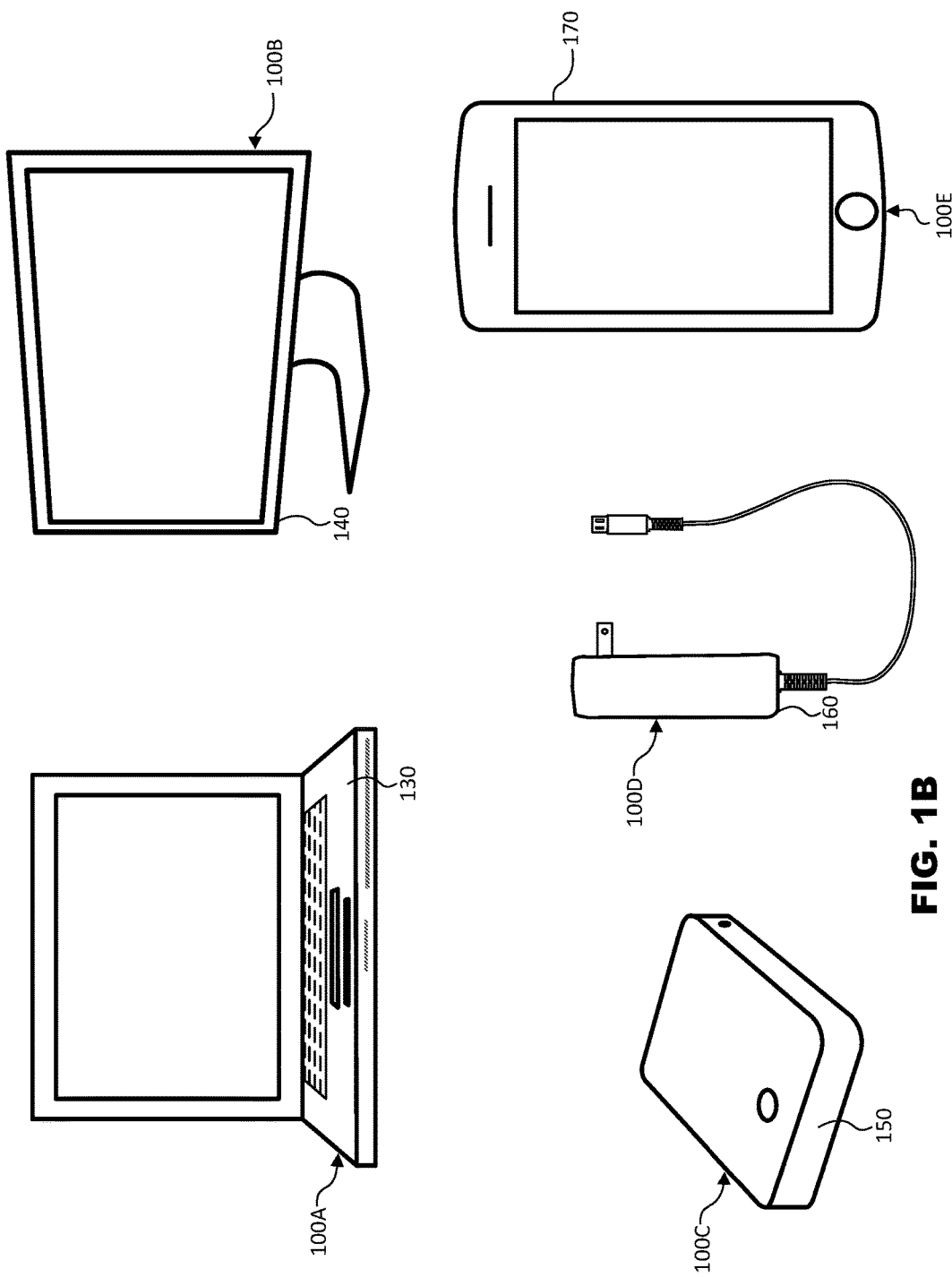

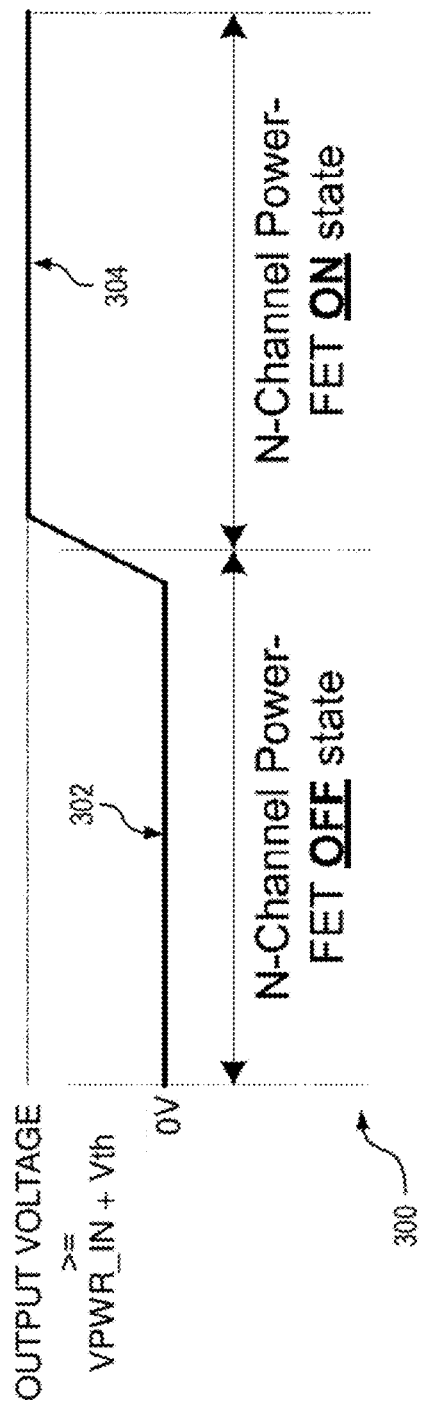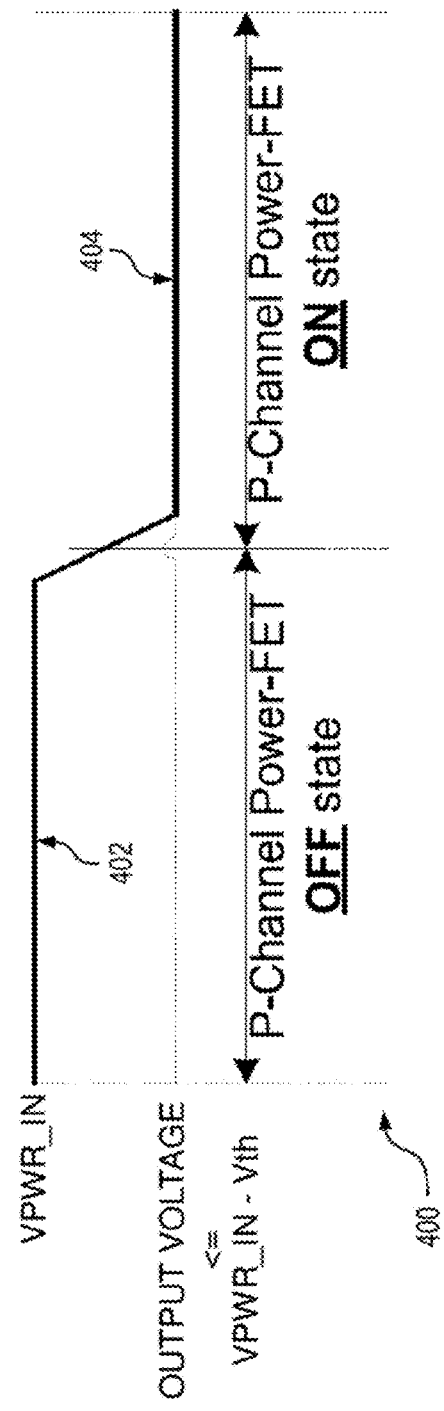

CONFIGURABLE AND POWER-OPTIMIZED INTEGRATED GATE-DRIVER FOR USB POWER-DELIVERY AND TYPE-C SOCS

PRIORITY

This application is a continuation of U.S. Non-Provisional application Ser. No. 15/200,538, filed on Jul. 1, 2016, which claims the priority and benefit of U.S. Provisional Application No. 62/336,183, filed on May 13, 2016, all of which are incorporated by reference herein in their entirety.

TECHNICAL FIELD

This disclosure relates to integrated circuits (ICs) and Systems-on-Chip (SoCs) that are configured to control power transfer to/from electronic devices.

BACKGROUND

Various electronic devices (e.g., such as smartphones, tablets, notebook computers, laptop computers, hubs, chargers, adapters, etc.) are configured to transfer power through Universal Serial Bus (USB) connectors. For example, in some applications an electronic device may be configured as a power consumer to receive power through a USB connector (e.g., for battery charging), while in other applications an electronic device may be configured as a power provider to provide power to another device that is connected thereto through a USB connector. Electronic devices are typically configured to transfer power through power paths that include power Field Effect Transistors (power-FETs) as switch devices. Generally, a power-FET is referred to as being of an N-channel type (an N-channel power-FET) when its source and drain are "n+" regions and its body is a "p" region. A power-FET is referred to as being of a P-channel type (a P-channel power-FET) when its source and drain are "p+" regions and its body is an "n" region. Since power-FETs may be of an N-channel type or a P-channel type that have different characteristics, electronic device manufacturers face various challenges when designing electronic devices that need to support power paths with N-channel power-FETs and power paths with P-channel power-FETs.

BRIEF DESCRIPTION OF THE DRAWINGS

FIG. 1B illustrates example devices that can include the IC controller with the USB subsystem of FIG. 1A, according to example embodiments.

FIG. 3 illustrates a diagram with voltage waveforms of a control signal at the gate of an N-channel power-FET, according to an example embodiment.

FIG. 4 illustrates a diagram with voltage waveforms of the control signal at the gate of a P-channel power-FET, according to the embodiment in FIG. 3.

DETAILED DESCRIPTION

Figure 1A:
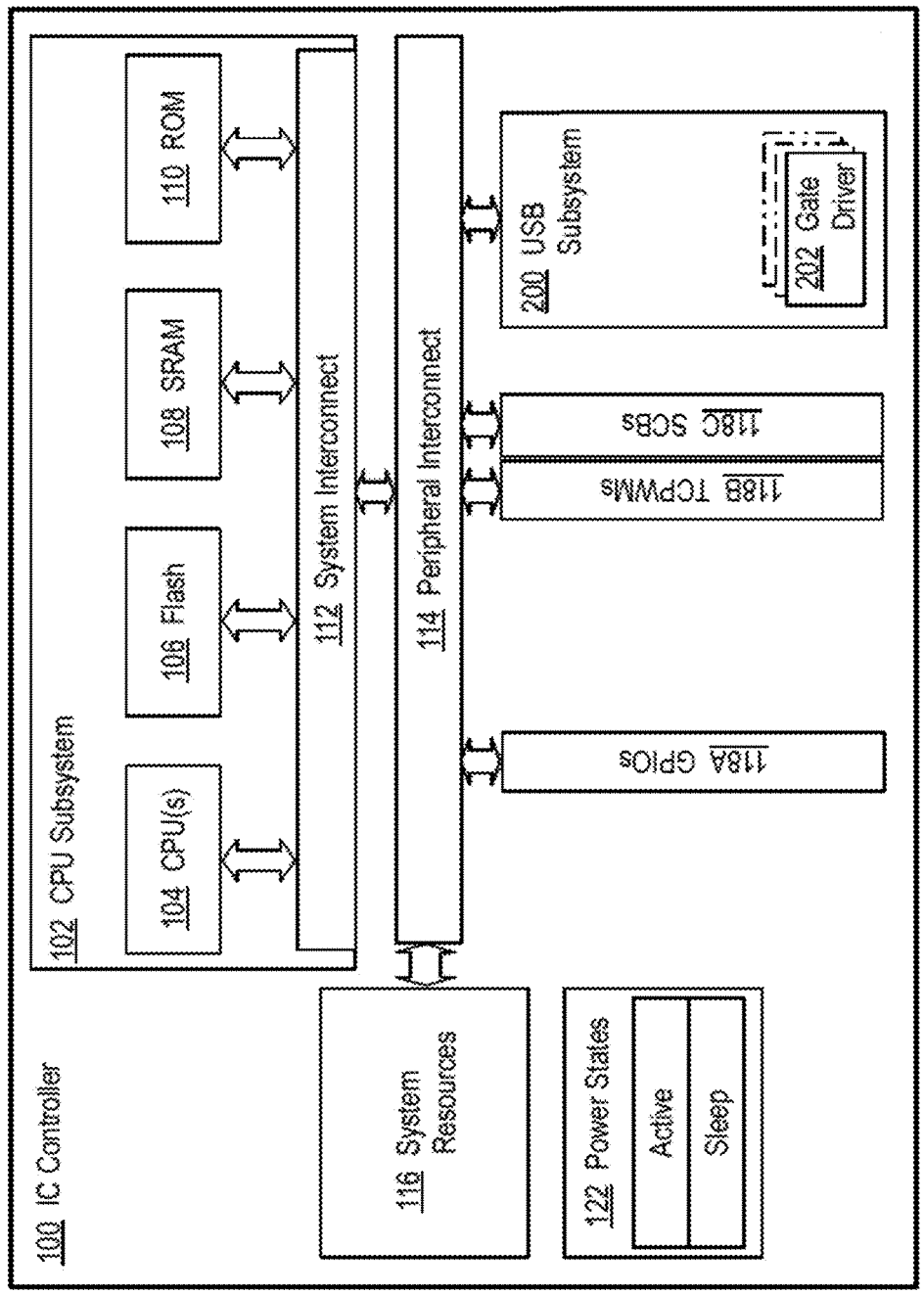
FIG. 1A illustrates an example on-die integrated circuit (IC) controller with a USB subsystem in accordance with some embodiments.

The following description sets forth numerous specific details such as examples of specific systems, components, methods, and so forth, in order to provide a good understanding of various embodiments of the techniques described herein for power-FET gate-driver circuits. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for power-FET gate-driver circuits in electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication and/or battery charging.

As used herein, an electronic device or a system is referred to as "USB-enabled" if the electronic device or system complies with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral electronic device attaches to a USB-enabled host device through a USB port of the host device to form a USB-enabled system. A USB 2.0 port includes a power line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

An emerging technology for USB connectors, called USB Type-C, was recently defined in various releases of the USB Type-C specification (e.g., such as Release 1.0 dated Aug. 11, 2014, Release 1.1 dated Apr. 3, 2015, etc). The various releases of the USB Type-C specification define USB Type-C receptacle, plug, and cables that can support USB communications as well as power delivery over newer USB power delivery protocols defined in various revisions of the USB Power Delivery (USB-PD) specification (e.g., such as Revision 1.0 released Jul. 5, 2012, Revision 2.0 released Aug. 11, 2014, etc).

Some electronic devices may be compliant with a specific release and/or version of the USB Type-C specification (e.g., such the USB Type-C Specification, Release 1.0, the USB Type-C Specification, Release 1.1, or a later release). As used herein, a "USB Type-C subsystem" refers to hardware circuitry that may be controllable by firmware and/or software in an integrated circuit (IC) controller, which is configured and operable to perform the functions and to satisfy the requirements specified in at least one release of the USB Type-C specification. Examples of such Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SNU) line for signaling of sideband functionality and a Configuration Channel (denoted CC) line for discovery, configuration, and management of connections across a Type-C cable. A Type-C port may be associated with a Type-C plug and with a Type-C receptacle. For ease of use, the Type-C plug and the Type-C receptacle are designed as a reversible pair that operates regardless of the plug-to-receptacle orientation. Thus, a standard Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some electronic devices may be compliant with a specific revision and/or version of the USB-PD specification (e.g., such the USB Power Delivery Specification, Revision 1.0, the USB Power Delivery Specification, Revision 2.0, or a later revisions and/or versions thereof). The USB-PD specification defines a standard protocol designed to enable the maximum functionality of USB-enabled devices by providing more flexible power delivery thereto/therefrom along with data communications over a single Type-C cable through USB Type-C ports. For example, the USB-PD specification describes the architecture, protocols, power supply behavior, parameters, and cabling necessary for managing power delivery over USB Type-C cables at up to 100 W of power. According to the USB-PD specification, USB-enabled devices may negotiate for more current and/or higher or lower voltages over a USB Type-C cable than are defined in older USB specifications (e.g., such as the USB 2.0 Specification, USB 3.1 Specification, the USB Battery Charging Specification Rev. 1.0/1.1/1.2, etc). As used herein, "USB-PD subsystem" refers to hardware circuitry that may be controllable by firmware and/or software in an integrated circuit (IC) controller, which is configured and operable to perform the functions and to satisfy the requirements specified in at least one release of the USB-PD specification.

An electronic device typically uses a power-transfer circuit (power path) to transfer power to/from the device. Among other electronic components, a power path includes one or more power-FETs that are coupled in-line on the circuit path to operate as switches (e.g., as ON/OFF switches). Power-FETs differ in some important characteristics from FETs and other types of transistor switch devices that are used for other, non-power-transfer applications. As a discrete semiconductor switching device, a power-FET needs to carry a large amount of current between its source and its drain while it is ON, to have very low resistance from its source to its drain while it is ON, and to withstand high voltages from its source to its drain while it is OFF. For example, a power-FET may be characterized as being able to carry currents in the range of several hundred milliamps (e.g., 500-900 mA) to several amps (e.g., 3-5 A, or higher), and to withstand voltages in the range of 12V to 40V (or higher) across its source to its drain. The resistance between the source and the drain of a power-FET device needs to be very small in order to prevent (or at least to keep very small) the power loss across the device. The resistance between the source and the drain of a power-FET is controlled (at least in part) by the voltage applied to the gate of the power-FET while it is ON by a gate-driver circuit (gate driver), which is used to control the power-FET in a given power path of an electronic device. For example, to turn and maintain ON an N-channel power-FET, a gate-driver circuit applies a positive voltage on the power-FET's gate that is higher than the voltage applied to the power-FET's source. This positive voltage difference between the gate voltage and the source voltage of a power-FET is referred to as "overdrive voltage", where the higher the overdrive voltage is the lower the resistance between the source and the drain of the power-FET becomes. To turn and maintain ON a P-channel power-FET, a gate-driver circuit needs to apply to the power-FET's gate a voltage that is lower than the voltage at the power-FET's source, where the lower the gate voltage is the lower the resistance between the source and the drain of the power-FET becomes.

Conventionally, N-channel power-FETs are preferred by semiconductor manufacturers because they are smaller in size and therefore require less semiconductor substrate area to provide the same power-transfer characteristics. However, P-channel power-FETs have the advantage of being able to turn ON at a 0V gate voltage, which is beneficial for some power-consumer applications (e.g., such as charging a dead battery in a mobile device). Because of the different characteristics of N-channel power-FETs and P-channel power-FETs, one type of a discrete IC controller is typically used to control N-channel power-FETs (e.g., as used in power-provider applications) and a different type of a discrete IC controller is used to control P-channel power-FETs (e.g., as used in power-consumer applications). A discrete separate IC controller typically operates by receiving a control signal from outside the controller chip, and translating that control signal into the voltage that is driven on the gate of the N-channel or P-channel power-FET. Thus, an electronic device manufacturer needs to decide which type of IC controller (e.g., controller for N-channel power-FETs or controller for P-channel power-FETs) to use in the power path(s) early in the design cycle of an electronic device, thereby losing the flexibility to use the same IC controller when having to control N-channel power-FETs and P-channel power-FETs for specific applications. This lack of flexibility leads to various disadvantages such as longer design times, an increased bill of materials (BOM), and a need to characterize multiple IC controller chips with different gate-driver circuits, among others.

To address these and other disadvantages of conventional IC controllers with gate drivers for power-FETs, in some embodiments the techniques described herein provide an IC controller with a programmable/configurable integrated gate-driver circuit that supports three output states for driving the gates of both N-channel power-FETs and P-channel power-FETs. In a first state (positive threshold state), the gate-driver circuit can be operatively programmed and/or configured to provide an output signal with a voltage that is equal to or exceeds a positive threshold voltage to turn and maintain ON N-channel power-FET(s). In a second state (zero-voltage, or 0V, state), the gate-driver circuit can be operatively programmed and/or configured to provide an output signal with a voltage that is substantially zero (i.e., 0V) to turn OFF N-channel power-FET(s) and to turn and maintain ON P-channel power-FET(s). In a third state (high-impedance, or HiZ, state), the gate-driver circuit can be operatively programmed and/or configured to provide a high impedance on its output to turn OFF P-channel power-FET(s). This ability to program/configure any of these three states during operation of the same gate-driver circuit, along with the methods described herein to automatically detect and/or select the type of power-FETs being used and to program any required gate-driver output voltages, allow the IC controllers described herein to provide a power-optimized, single-chip solution for manufacturers that require the design flexibility to choose N-channel and/or P-channel power-FETs for various applications.

In an example embodiment, a device comprises a USB subsystem that is disposed in a monolithic (single) integrated circuit (IC) formed on a semiconductor substrate. The USB subsystem comprises a gate-driver circuit configured to selectively control an N-channel power-FET or a P-channel power-FET, where the N-channel power-FET and the P-channel power-FET are external to the single IC. In one example aspect the USB subsystem is a USB-PD subsystem, while in another aspect the USB subsystem is a USB Type-C subsystem. In one example aspect, the gate-driver circuit is configured to control the external N-channel power-FET and the external P-channel power-FET based on control signals from the USB subsystem. In another example aspect, the gate-driver circuit is configured to control the external N-channel power-FET on one or more outputs of the single IC, and also to control the external P-channel power-FET on the same one or more outputs of the single IC. In one example aspect, the USB subsystem is configured to determine whether the external N-channel power-FET or the external P-channel power-FET is coupled to the gate-driver circuit and to select the corresponding firmware or operation mode to control the coupled external power-FET. In another example aspect, the gate-driver circuit is configured to provide an output signal at a positive threshold voltage, at a zero voltage, and at a high-impedance. In one example aspect, the gate-driver circuit includes one output configured to control two power-FETs that are coupled on an external power path. In another example aspect, the gate-driver circuit includes two separate outputs configured to independently control two separate power-FETs that are coupled on an external power path.

In an example embodiment, a method for a USB-enabled device with an IC controller comprises: determining, by the IC controller, whether an external N-channel power-FET or an external P-channel power-FET is coupled to the IC controller; controlling the external N-channel power-FET by a gate-driver circuit of the IC controller, when the external N-channel power-FET is determined as being coupled to the IC controller; and controlling the external P-channel power-FET by the gate-driver circuit of the IC controller, when the external P-channel power-FET is determined as being coupled to the IC controller. In one example aspect, determining whether the external N-channel power-FET or the external P-channel power-FET is coupled to the IC controller comprises receiving a signal on an input of the IC controller. In another example aspect, determining whether the external N-channel power-FET or the external P-channel power-FET is coupled to the IC controller comprises uploading a firmware setting in the IC controller. In another example aspect, determining whether the external N-channel power-FET or the external P-channel power-FET is coupled to the IC controller comprises performing voltage detection on one or more outputs of the gate-driver circuit. In one example aspect, controlling the external N-channel power-FET comprises: outputting, by the gate-driver circuit, a positive threshold voltage to turn ON the external N-channel power-FET; and outputting, by the gate-driver circuit, a zero voltage to turn OFF the external N-channel power-FET. In another example aspect, controlling the external P-channel power-FET comprises: outputting, by the gate-driver circuit, a zero voltage to turn ON the external P-channel power-FET; and outputting, by the gate-driver circuit, a high impedance to turn OFF the external P-channel power-FET. In one example aspect of this embodiment, the method further comprises determining a voltage level for an output signal of the gate-driver circuit.

In an example embodiment, a USB-enabled system comprises a power path and an IC controller coupled to control the power path, where the power path is external to the IC controller. The IC controller is configured and/or programmable to: determine whether an N-channel power-FET or a P-channel power-FET is coupled in the power path; control the N-channel power-FET when the N-channel power-FET is determined as being coupled in the power path; and control the P-channel power-FET when the P-channel power-FET is determined as being coupled in the power path. In one example aspect of this embodiment the power path is a power-consumer path, while in another example aspect the power path is a power-provider path. In some aspects of this embodiment, the IC controller comprises a USB subsystem. The USB subsystem may be a USB-PD subsystem, a USB Type-C subsystem, or both.

FIG. 1A illustrates an example device 100 that is configured in accordance with the techniques for power-FET gate-driver circuits described herein. In the embodiment illustrated in FIG. 1A, device 100 is an integrated circuit (IC) controller chip manufactured on an IC die. For example, IC controller 100 may be a single-chip IC device from the family of CCGx USB controllers developed by Cypress Semiconductor Corporation, San Jose, Calif. In another example, IC controller 100 may be a single-chip IC that is manufactured as a System-on-Chip (SoC).

Among other components, IC controller 100 includes CPU subsystem 102, peripheral interconnect 114, system resources 116, various input/output (I/O) blocks (e.g., 118A-118C), and USB subsystem 200. In addition, IC controller 100 provides circuitry and firmware that is configured and operable to support a number of power states 122.

CPU subsystem 102 includes one or more CPUs (central processing units) 104, flash memory 106, SRAM (Static Random Access Memory) 108, and ROM (Read Only Memory) 110 that are coupled to system interconnect 112. CPU 104 is a suitable processor that can operate in a system-on-chip device. In some embodiments, the CPU may be optimized for low-power operation with extensive clock gating and may include various internal controller circuits that allow the CPU to operate in various power states. For example, the CPU may include a wake-up interrupt controller that is configured to wake the CPU from a sleep state, thereby allowing power to be switched off when the IC chip is in the sleep state. Flash memory 106 can be any type of program memory (e.g., NAND flash, NOR flash, etc.) that is configurable for storing data and/or programs. SRAM 108 can be any type of volatile or non-volatile memory that is suitable for storing data and firmware/software instructions accessed by CPU 104. ROM 110 can be any type of suitable storage that is configurable for storing boot-up routines, configuration parameters, and other system-on-chip firmware parameters and settings. System interconnect 112 is a system bus (e.g., a single-level or multi-level Advanced High-Performance Bus, or AHB) that is configured as an interface that couples the various components of CPU subsystem 102 to each other, as well as a data and control interface between the various components of the CPU subsystem and peripheral interconnect 114.

Peripheral interconnect 114 is a peripheral bus (e.g., a single-level or multi-level AHB) that provides the primary data and control interface between CPU subsystem 102 and its peripherals and other resources, such as system resources 116, I/O blocks (e.g., 118A-118C), and USB subsystem 200. The peripheral interconnect may include various controller circuits (e.g., direct memory access, or DMA controllers), which may be programmed to transfer data between peripheral blocks without burdening the CPU subsystem. In various embodiments, each of the components of the CPU subsystem and the peripheral interconnect may be different with each choice or type of CPU, system bus, and/or peripheral bus.

System resources 116 include various electronic circuits that support the operation of IC controller 100 in its various states and modes. For example, system resources 116 may include a power subsystem that provides the power resources required for each controller state/mode such as, for example, voltage and/or current references, wake-up interrupt controller (WIC), power-on-reset (POR), etc. In some embodiments, the power subsystem of system resources 116 may also include circuits that allow IC controller 100 to draw and/or provide power from/to external sources with several different voltage and/or current levels. System resources 116 may also include a clock subsystem that provides various clocks that are used by IC controller 100, as well as circuits that implement various controller functions such as external reset.

An IC controller, such as IC controller 100, may include various different types of I/O blocks and subsystems in various embodiments and implementations. For example, in the embodiment illustrated in FIG. 1A, IC controller 100 includes GPIO (general purpose input output) blocks 118A, TCPWM (timer/counter/pulse-width-modulation) blocks 118B, SCBs (serial communication blocks) 118C, and USB subsystem 200. GPIOs 118A include circuits configured to implement various functions such as, for example, pull-ups, pull-downs, input threshold select, input and output buffer enabling/disabling, multiplex signals connected to various I/O pins, etc. TCPWMs 118B include circuits configured to implement timers, counters, pulse-width modulators, decoders and various other analog/mixed signal elements that are configured to operate on input/output signals. SCBs 118C include circuits configured to implement various serial communication interfaces such as, for example, $I^2C$, SPI (serial peripheral interface), UART (universal asynchronous receiver/transmitter), etc.

USB subsystem 200 is configured in accordance with the techniques described herein, and may also provide support for USB communications over USB ports (e.g., such as USB 2.0, USB 3.0/3.1, etc.) as well other USB functionality such as power delivery and battery charging. For example, in various embodiments USB subsystem 200 may be a USB-PD subsystem, a USB Type-C subsystem, or both (e.g., a USB-Type C subsystem that supports USB-PD functionality). USB subsystem 200 includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. IC controller 100 (and/or the USB subsystem 200 thereof) may also be configured to respond to communications defined in a USB-PD Specification such as, for example, SOP, SOP', and SOP" messaging.

In the embodiment illustrated in FIG. 1A, USB subsystem 200 includes one or more gate-driver circuits 202 configured in accordance with the techniques described herein. Each gate-driver circuit 202 is configurable and programmable to select whether to control N-channel power-FET(s) or P-channel power-FET(s) that may be coupled in power path(s) that are external to IC controller 100. For example, each gate-driver circuit 202 is configured to generate an output signal in a positive threshold state, in a zero-voltage state, and in a high-impedance state to drive the gates of both N-channel power-FETs and P-channel power-FETs, in accordance with the techniques described herein.

FIG. 1B illustrates example operational contexts in which the described techniques for power-FET gate-driver circuits may be implemented. In each of these operational contexts, an IC controller (such as IC controller 100 of FIG. 1A) can be disposed and configured in an electronic device (e.g., a USB-enabled device) to perform operations in accordance with the techniques described herein. Referring to FIG. 1B, in one example embodiment an IC controller 100A may be disposed and configured in a computing device (e.g., laptop computer 130). In another example embodiment, an IC controller 100B may be disposed and configured in an electronic device (e.g., monitor 140). In yet another example embodiment, an IC controller 100C may be disposed and configured in a networking/connectivity device (e.g., hub 150). In yet another example embodiment, an IC controller 100D may be disposed and configured in a charging device (e.g., wall charger 160). In yet another example embodiment, an IC controller 100E may be disposed and configured in a mobile device (e.g., smartphone or tablet 170). In other embodiments, an IC controller with the power-FET gate-driver circuits described herein may be disposed in various other electronic or electro-mechanical devices (e.g., servo motors, variable frequency drives, power supplies, power converters, etc.) to control various power-FETs, insulated-gate bipolar transistors (IGBTs), and the like.

Figure 2A:
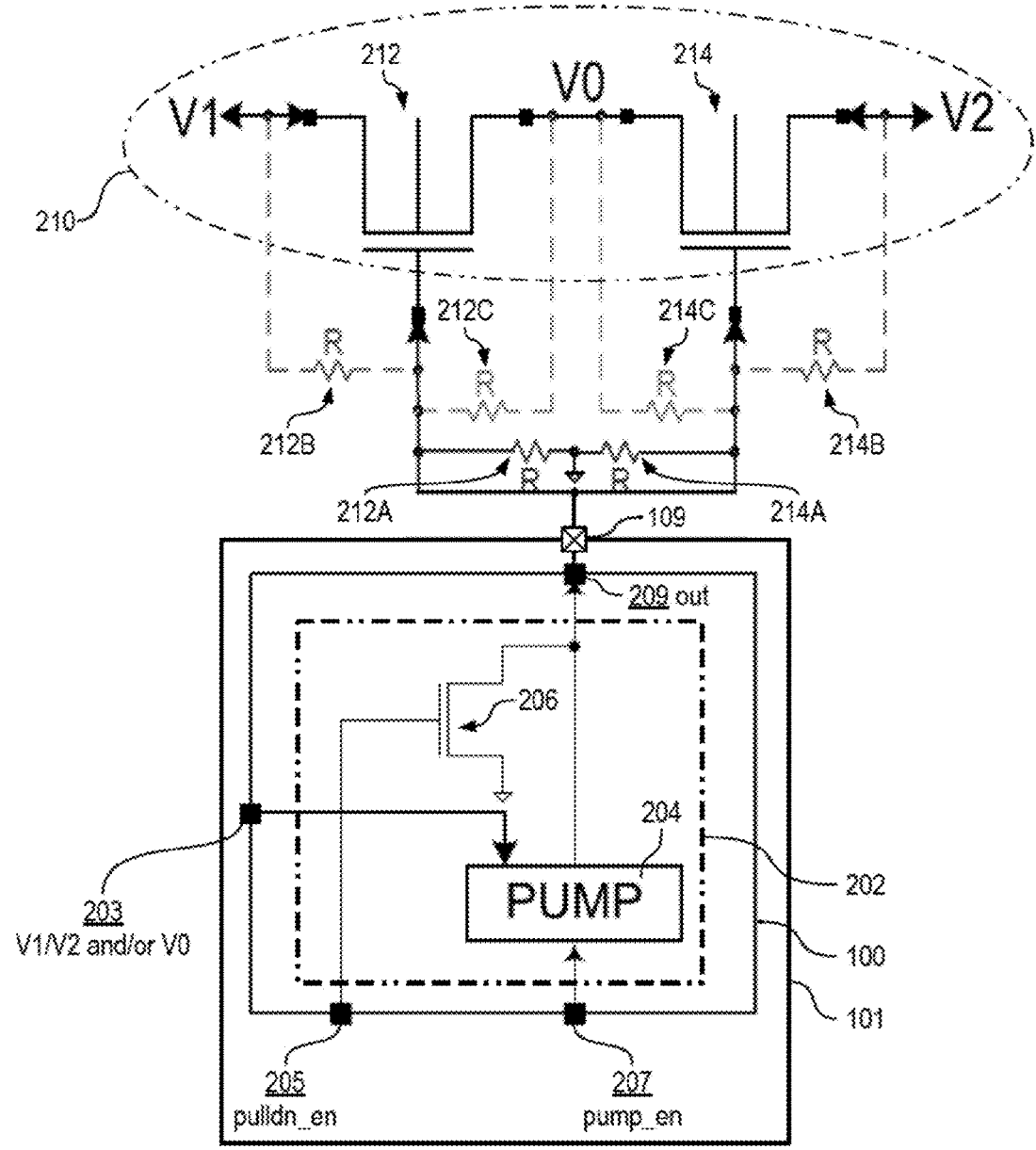
FIG. 2A illustrates an example integrated gate-driver circuit for power-FETs with common gate controls, according to some embodiments.

FIG. 2A illustrates an IC controller 100 with an example integrated gate-driver circuit 202 for power-FETs in accordance with the techniques described herein. IC controller 100 may be the same as controller 100 illustrated in FIG. 1A, or may be a controller with structural elements of a different type of SoC.

In FIG. 2A, IC controller 100 includes a gate-driver circuit 202 configured in accordance with the techniques described herein. Gate-driver circuit 202 includes pump 204 and a transistor switch device 206. Pump 204 is coupled to inputs 203 and 207 of IC controller 100, and the output of pump 204 is coupled to output 209 of gate-driver circuit 202. Input 203 is configured to receive programmable voltages V1/V2, and/or V0 from firmware and/or registers of IC controller 100 and to apply the received voltage(s) to pump 204. Input 207 of IC controller 100 is configured to receive an enable signal configured to enable/disable pump 204. Switch 206 is coupled between output 209 and ground, where the gate of switch 206 is coupled to input 205 of IC controller 100. Input 205 is configured to receive an enable signal from firmware of IC controller 100 where, when applied to the gate of switch 206, the enable signal on input 205 is configured to turn on switch 206 in order to pull down the voltage on output 209 of gate-driver circuit 202. IC controller 100 is disposed in chip package 101, which is coupled to external power path 210 through chip pin 109.

In the embodiment illustrated in FIG. 2A, gate-driver circuit 202 uses a common driver output 209 to simultaneously control two power-FETs (212 and 214) in power path 210. The two power-FETs 212 and 214 are coupled in series in-line on power path 210. One reason for using two power-FETs to control the power path is because a power-FET has an intrinsic parasitic "body diode" between its source and its drain, where such intrinsic parasitic "body diode" is always going to be "on" in one direction of the power path. Thus, coupling two power-FETs in series with their intrinsic parasitic "body diodes" facing in opposite directions substantially eliminates the effect these "body diodes" in the power path.

FIG. 2A illustrates how both N-channel power-FETs and P-channel power-FETs can be coupled to a common control output of gate-driver circuit 202. Regardless of whether the power-FETs 212 and 214 in power path 210 are N-channel type or a P-channel type, the gates of both power-FETs 212 and 214 are each coupled to output 209 of gate-driver circuit 202 through pin 109 on chip package 101. As indicated in FIG. 2A, power-FETs 212 and 214 are both N-channel power-FETs where, as indicated by solid lines, the gate of power-FET 212 is coupled to ground through resistor element 212A and the gate of power-FET 214 is coupled to ground through resistor element 214A. In one alternative setup of the power path, power-FETs 212 and 214 may be both P-channel power-FETs where, as indicated by dashed lines, the source of power-FET 212 may be coupled to the gate of power-FET 212 through resistor element 212B and the source of power-FET 214 may be coupled to the gate of power-FET 214 through resistor element 214B. In a different alternative setup of the power path, power-FETs 212 and 214 may be both P-channel power-FETs where, as indicated by dashed lines, the drain of power-FET 212 may be coupled to the gate of power-FET 212 through resistor element 212C and the drain of power-FET 214 may be coupled to the gate of power-FET 214 through resistor element 214C. When power-FETs 212 and 214 in power path 210 are of the P-channel type, gate-driver circuit 202 is configured to provide a high impedance at the gates of the power-FETs 212 and 214 by simply floating output 209, which causes resistor elements 212B and 214B (or, 212C and 214C) to pull the gate voltages of power-FETs 212 and 214 to the source (or drain) voltage of the respective power-FET.

When power-FETs 212 and 214 in power path 210 are of the N-channel type, gate-driver circuit 202 drives the gates of the N-channel power-FETs 212 and 214 at an output voltage of substantially 0V to turn these power-FETs OFF and at a positive voltage (e.g., higher than the power-FETs' source voltage) to turn these power-FETs ON. Specifically, gate-driver circuit 202 receives voltages V1/V2 and/or V0 through input 203. Voltages V0, V1, and V2 are typically (but not necessarily) the same and represent the voltage that needs to pass through power path 210. In various implementations, IC controller 100 (and/or any USB subsystem thereof) may detect and/or generate voltages V0, V1, and V2 and may provide these voltages as reference voltages to pump 204. Firmware logic and/or other hardware in pump 204 is configured to use the reference voltages to generate, at output 209, an output signal with a voltage that is sufficient to turn ON N-channel power-FETs 212 and 214. When IC controller 100 (and/or any USB subsystem thereof) provides an enable signal at input 207 (with no enable signal provided at input 205), pump 204 is turned on to generate and drive an output signal of sufficient positive voltage through output 209 and pin 109 to the gates of N-channel power-FETs 212 and 214. As a result, N-channel power-FETs 212 and 214 are turned ON to pass their designated current, thereby effectuating a transfer of power through power path 210. To turn OFF the N-channel power-FETs 212 and 214, IC controller 100 (and/or any USB subsystem thereof) removes the enable signal from input 207 to turn pump 204 off and applies a pull-down enable signal at input 205. The enable signal on input 205 turns on switch 206 and the output voltage at output 209 is driven to system ground. As a result, a voltage of substantially 0V is applied to the gates of N-channel power-FETs 212 and 214, which turns OFF these power-FETs thereby stopping the transfer of power through power path 210.

When power-FETs 212 and 214 in power path 210 are of the P-channel type, gate-driver circuit 202 drives the gates of the P-channel power-FETs 212 and 214 at an output voltage of substantially 0V to turn these power-FETs ON and at high impedance (HiZ) to turn these power-FETs OFF. When IC controller 100 (and/or any USB subsystem thereof) provides a pull-down enable signal at input 205 (with no enable signal provided at input 207 thereby keeping pump 204 off), the pull-down enable signal turns on switch 206 and the output voltage at output 209 is driven to system ground (e.g., a strong 0V). As a result, a voltage of substantially 0V is applied to the gates of P-channel power-FETs 212 and 214, which turns ON these power-FETs thereby effectuating a transfer of power through power path 210. To turn OFF the P-channel power-FETs 212 and 214, IC controller 100 (and/or any USB subsystem thereof) removes the pull-down enable signal from input 205 and switch 206 is turned off to float the output 209. As a result, output 209 is driven to high impedance and the external resistor elements 212B and 214B (or, 212C and 214C) pull-up the voltages at the gates of P-channel power-FETs 212 and 214 to voltages V1/V2 (or, V0). Thus, the high impedance driven on output 209 causes the gate voltages of P-channel power-FETs 212 and 214 to turn OFF these power-FETs, thereby stopping the transfer of power through power path 210.

Figure 2B:
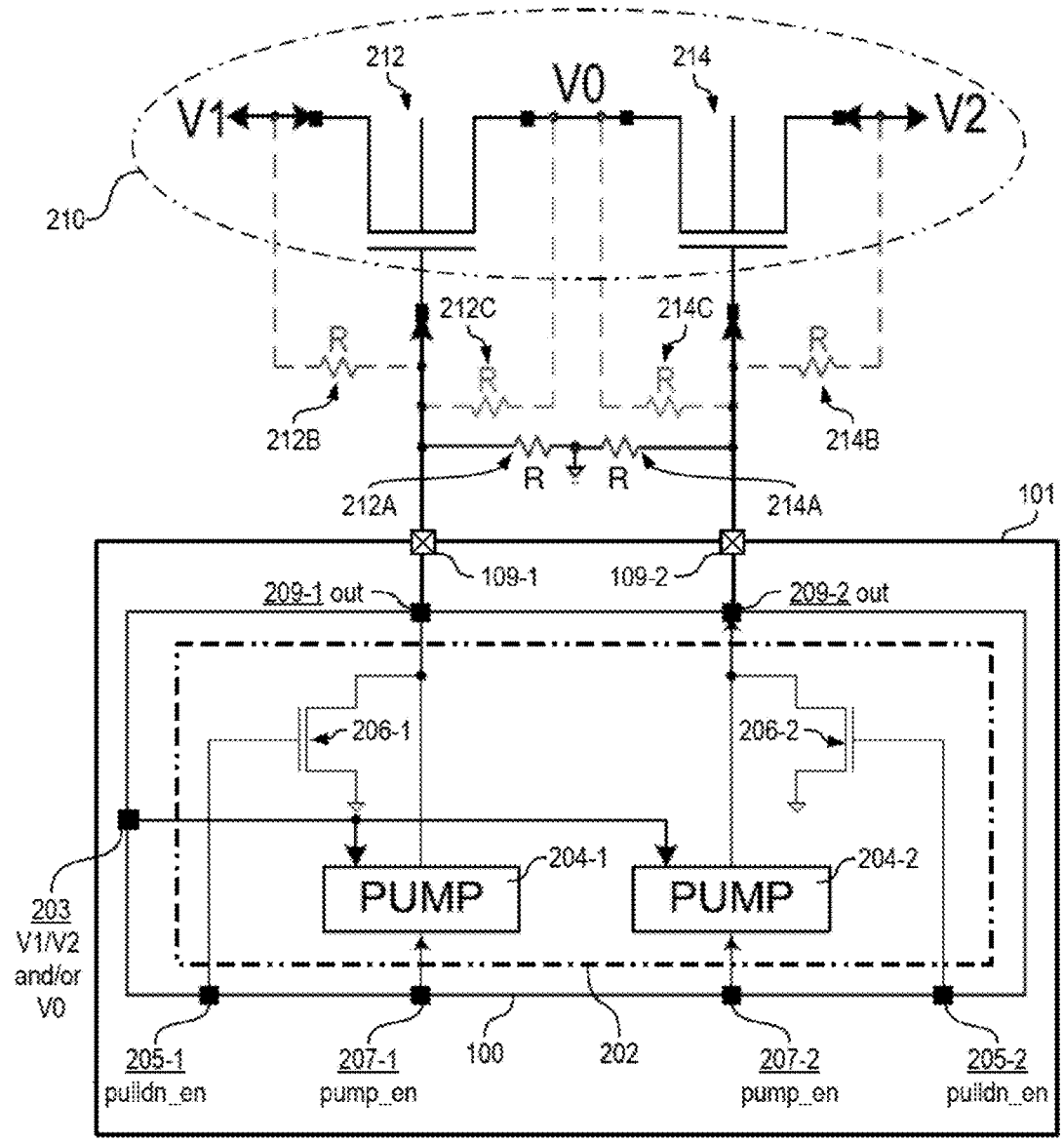
FIG. 2B illustrates an example integrated gate-driver circuit for power-FETs with independent gate controls, according to some embodiments.

FIG. 2B illustrates an IC controller 100 with an example integrated gate-driver circuit 202 for power-FETs in accordance with the techniques described herein. IC controller 100 may be the same as controller 100 illustrated in FIG. 1A, or may be a controller with structural elements of a different type of SoC. Unlike FIG. 2A, the gate-driver circuit 202 in FIG. 2B is configured with two independently-controlled driver outputs, which allows each power-FET in power path 210 to be turned ON/OFF at a time offset from the other in order to avoid in-rush current.

In FIG. 2B, IC controller 100 includes a gate-driver circuit 202 configured in accordance with the techniques described herein. Gate-driver circuit 202 includes pumps 204-1 and 204-2, and transistor switch devices 206-1 and 206-2. Pump 204-1 is coupled to inputs 203 and 207-1 of IC controller 100, and the output of pump 204-1 is coupled to output 209-1 of gate-driver circuit 202. Pump 204-2 is coupled to inputs 203 and 207-2 of IC controller 100, and the output of pump 204-2 is coupled to output 209-2 of gate-driver circuit 202. Input 203 is configured to receive programmable voltages V1/V2, and/or V0 from firmware and/or registers of IC controller 100 and to apply the received voltage(s) to pumps 204-1 and 204-2. Input 207-1 of IC controller 100 is configured to receive an enable signal configured to enable/disable pump 204-1, and input 207-2 is configured to receive an enable signal configured to enable/disable pump 204-2. Switch 206-1 is coupled between output 209-1 and ground, where the gate of switch 206-1 is coupled to input 205-1 of IC controller 100. Input 205-1 is configured to receive an enable signal from firmware of IC controller 100 where, when applied to the gate of switch 206-1, the enable signal is configured to turn on switch 206-1 in order to pull down the voltage on output 209-1. Switch 206-2 is coupled between output 209-2 and ground, where the gate of switch 206-2 is coupled to input 205-2 of IC controller 100. Input 205-2 is configured to receive an enable signal from firmware of IC controller 100 where, when applied to the gate of switch 206-2, the enable signal is configured to turn on switch 206-2 in order to pull down the voltage on output 209-2. IC controller 100 is disposed in chip package 101, where output 209-1 of gate-driver circuit 202 is coupled through chip pin 109-1 to power-FET 212 in external power path 210 and output 209-2 of gate-driver circuit 202 is coupled through chip pin 109-2 to power-FET 214 in the external power path 210.

In the embodiment illustrated in FIG. 2B, gate-driver circuit 202 uses two independently-controlled driver outputs (209-1 and 209-2) to separately control each of power-FETs 212 and 214 in power path 210. Using the two independently-controlled driver outputs allows gate-driver 202 to turned ON/OFF power-FETs 212 and 214 at a time offset from each other, where the time offset (e.g., several hundreds of microseconds) may be programmable and/or stored in the firmware/registers of IC controller 100 that are used to control application of enable signals to inputs 205-1, 205-2, 207-1, and 207-2.

FIG. 2B illustrates how both N-channel power-FETs and P-channel power-FETs can be coupled to respective independently-controlled outputs of gate-driver circuit 202. Regardless of whether the power-FETs in power path 210 are N-channel type or a P-channel type, the gate of power-FET 212 is coupled through pin 109-1 to output 209-1 of gate-driver circuit 202 and the gate of power-FET 214 is coupled through pin 109-2 to output 209-2 of the gate-driver circuit 202. As indicated in FIG. 2B, power-FETs 212 and 214 are both N-channel power-FETs where, as indicated by solid lines, the gate of power-FET 212 is coupled to ground through resistor element 212A and the gate of power-FET 214 is coupled to ground through resistor element 214A. In one alternative setup of the power path, power-FETs 212 and 214 may be both P-channel power-FETs where, as indicated by dashed lines, the source of power-FET 212 may be coupled to the gate of power-FET 212 through resistor element 212B and the source of power-FET 214 may be coupled to the gate of power-FET 214 through resistor element 214B. In a different alternative setup of the power path, power-FETs 212 and 214 may be both P-channel power-FETs where, as indicated by dashed lines, the drain of power-FET 212 may be coupled to the gate of power-FET 212 through resistor element 212C and the drain of power-FET 214 may be coupled to the gate of power-FET 214 through resistor element 214C. When power-FETs 212 and 214 in power path 210 are of the P-channel type, gate-driver circuit 202 is configured to provide high impedance at the gates of power-FETs 212 and 214 by simply floating outputs 209-1 and 209-2, respectively, which causes resistor elements 212B and 214B (or, 212C and 214C) to pull the gate voltages of power-FETs 212 and 214 to the source (or drain) voltage of the respective power-FET.

When power-FETs 212 and 214 in power path 210 are of the N-channel type, gate-driver circuit 202 drives the gates of the N-channel power-FETs 212 and 214 at an output voltage of substantially 0V to turn these power-FETs OFF and at a positive voltage (e.g., higher than the power-FETs' source voltage) to turn these power-FETs ON. Specifically, gate-driver circuit 202 receives voltages V1/V2 and/or V0 through input 203. Voltages V0, V1, and V2 are typically (but not necessarily) the same and represent the voltage that needs to pass through power path 210. In various implementations, IC controller 100 (and/or any USB subsystem thereof) may detect and/or generate voltages V0, V1, and V2 and may provide these voltages as reference voltages to pumps 204-1 and 204-2. Firmware logic and/or other hardware in pumps 204-1 and 204-2 is configured to use the reference voltages to generate, respectively at outputs 209-1 and 209-2, separate output signals with a voltage that is sufficient to turn ON N-channel power-FETs 212 and 214.

When IC controller 100 (and/or any USB subsystem thereof) provides an enable signal at input 207-1 (with no enable signal provided at input 205-1), pump 204-1 is turned on to generate and drive an output signal of sufficient positive voltage through output 209-1 and pin 109-1 to the gate of N-channel power-FET 212. Similarly, when IC controller 100 (and/or any USB subsystem thereof) provides an enable signal at input 207-2 (with no enable signal provided at input 205-2), pump 204-2 is turned on to generate and drive an output signal of sufficient positive voltage through output 209-2 and pin 109-2 to the gate of N-channel power-FET 214. As a result, N-channel power-FETs 212 and 214 are independently turned ON (separately, and possibly at a slight time offset) to pass their designated current, thereby effectuating a transfer of power through power path 210. To turn OFF the N-channel power-FET 212, IC controller 100 (and/or any USB subsystem thereof) removes the enable signal from input 207-1 to turn pump 204-1 off and applies a pull-down enable signal at input 205-1. The enable signal on input 205-1 turns on switch 206-1 and the output voltage at output 209-1 is driven to system ground. Similarly, to turn OFF the N-channel power-FET 214, IC controller 100 (and/or any USB subsystem thereof) removes the enable signal from input 207-2 to turn pump 204-2 off and applies a pull-down enable signal at input 205-2. The enable signal on input 205-2 turns on switch 206-2 and the output voltage at output 209-2 is driven to system ground. As a result, a voltage of substantially 0V is independently applied to the gates of N-channel power-FETs 212 and 214, which turns OFF these power-FETs (separately, and possibly at a slight time offset) thereby stopping the transfer of power through power path 210.

When power-FETs 212 and 214 in power path 210 are of the P-channel type, gate-driver circuit 202 drives the gates of the P-channel power-FETs 212 and 214 at an output voltage of substantially 0V to turn these power-FETs ON and at high impedance (HiZ) to turn these power-FETs OFF. When IC controller 100 (and/or any USB subsystem thereof) provides a pull-down enable signal at input 205-1 (with no enable signal provided at input 207-1 thereby keeping pump 204-1 off), the pull-down enable signal at input 205-1 turns on switch 206-1 and the output voltage at output 209-1 is driven to system ground (e.g., a strong 0V). Similarly, when IC controller 100 (and/or any USB subsystem thereof) provides a pull-down enable signal at input 205-2 (with no enable signal provided at input 207-2 thereby keeping pump 204-2 off), the pull-down enable signal at input 205-2 turns on switch 206-2 and the output voltage at output 209-2 is driven to system ground (e.g., a strong 0V). As a result, a voltage of substantially 0V is independently applied to the gates of P-channel power-FETs 212 and 214, which turns ON these power-FETs (separately, and possibly at a slight time offset) thereby effectuating a transfer of power through power path 210. To turn OFF the P-channel power-FET 212, IC controller 100 (and/or any USB subsystem thereof) removes the pull-down enable signal from input 205-1 and switch 206-1 is turned off to float the output 209-1. Similarly, to turn OFF the P-channel power-FET 214, IC controller 100 (and/or any USB subsystem thereof) removes the pull-down enable signal from input 205-2 and switch 206-2 is turned off to float the output 209-2. As a result, high impedance is independently driven on outputs 209-1 and 209-2 and the external resistor elements 212B and 214B (or, 212C and 214C) pull-up the voltages at the gates of P-channel power-FETs 212 and 214 to voltages V1/V2 (or, V0). Thus, the high impedance driven on outputs 209-1 and 209-2 cause the gate voltages of P-channel power-FETs 212 and 214 to turn OFF these power-FETs (separately, and possibly at a slight time offset), thereby stopping the transfer of power through power path 210.

FIGS. 3 and 4 illustrate voltage diagrams of control signals that can be applied by the same gate-driver circuit to control an N-channel power-FET and a P-channel power-FET, respectively, in accordance with the techniques described herein.

FIG. 3 illustrates the voltage waveform of a control signal driven by a gate-driver circuit to the gate of an N-channel power-FET, in accordance with the techniques described herein. In order to pass a power-transfer voltage "vpwr_in" through an N-channel power-FET, a gate-driver circuit needs to output an output voltage that is higher than the sum of the power-transfer voltage and the threshold voltage of the N-channel power-FET, i.e., $$\text{output voltage} >= vpwr\_in + Vth$$

where Vth is the threshold voltage of the N-channel power-FET. To turn OFF the N-channel power-FET, the gate-driver circuit may provide an output voltage of substantially 0V. Operation of the gate-driver circuit for N-channel power-FETs is illustrated in voltage diagram 300 in FIG. 3. Voltage diagram 300 illustrates that an N-channel power-FET is in the OFF state when the gate-driver output signal has an output voltage 302 (e.g., such as 0V), and that the N-channel power-FET is in the ON state when the gate-driver output signal has an output voltage 304 that is higher than or equal to the "vpwr_in" voltage plus the Vth voltage of the power-FET.

It is noted that when the Vgs (gate-to-source) voltage of an N-channel power-FET goes beyond the Vth voltage, the power-FET turns ON. The amount (e.g., the overdrive voltage) by which Vgs exceeds Vth determines the eventual resistance of the N-channel power-FET. In other words, the resistance of the N-channel power-FET decreases as higher voltage is applied to the gate of the power-FET. Further, the N-channel power-FET needs to stay ON for the entire voltage range that the power-FET is supposed to pass through. For instance, if an N-channel power-FET has to pass 20V between its drain and its source and Vth of the power-FET is 1V, then a voltage of at least 21V (or higher, such as 25V) needs to be applied to the power-FETs' gate to turn it ON and keep it ON. In order turn OFF this N-channel power-FET, a voltage lower than the Vth of the power-FET (e.g., such as 0V) needs to be applied at the gate of the power-FET. According to the techniques described herein, a gate-driver circuit is configured to determine (e.g., from settings in firmware or by detection on the driver outputs) the voltage "vpwr_in" that the N-channel power-FET needs to pass and a corresponding overdrive voltage. Then, based on the determined "vpwr_in" and overdrive voltages, the gate-driver circuit is configured to use a constant charge pump to determine and to generate an output voltage that is applied to the gate of the N-channel power-FET to turn it ON. When the N-channel power-FET needs to be turned OFF, the gate-driver circuit simply applies a system ground (e.g., 0V) to the gate of the power-FET.

FIG. 4 illustrates the voltage waveform of a control signal driven by the gate-driver circuit of FIG. 3 to the gate of a P-channel power-FET, in accordance with the techniques described herein. In order to pass a power-transfer voltage "vpwr_in" through a P-channel power-FET, the gate-driver circuit needs to pull down the output voltage that is driven to the power-FET's gate—for example, such that the voltage division between an external resistor (e.g., coupled between the power-FET's gate and source) and the internal pull-down (e.g., a system ground) effectively generates an output voltage that is lower than or equal to the difference between the power-transfer voltage and the threshold voltage of the P-channel power-FET, i.e., output voltage<=vpwr_in−*Vth* where Vth is the threshold voltage of the P-channel power-FET. To turn OFF the P-channel power-FET, the gate-driver circuit needs to provide a high-impedance output so that the external resistor can pull-up the power-FET's gate to the power-transfer voltage "vpwr_in," thereby turning OFF the P-channel power-FET. Operation of the gate-driver circuit for P-channel power-FETs is illustrated in voltage diagram 400 in FIG. 4. Voltage diagram 400 illustrates that a P-channel power-FET is in the OFF state when the gate-driver output signal causes an output voltage 402 (e.g., such as the power-transfer voltage "vpwr_in") at the gate of the P-channel power-FET, and that the P-channel power-FET is in the ON state when the gate-driver output signal has an output voltage 404 that is lower than or equal to the "vpwr_in" voltage minus the Vth voltage of the power-FET (e.g., such as 0V).

It is noted that a P-channel power-FET turns ON whenever the power-FET's gate is at a lower voltage than its source. For instance, when a P-channel power-FET needs to pass 12V from its source to its drain, then the power-FET's gate voltage needs to be less than its source voltage (e.g., at 11V) in order to turn the power-FET ON. To turn OFF this P-channel power-FET, the gate-driver circuit needs to apply to the gate of the power-FET the same voltage as the voltage on the power-FET's source—in this case, 12V. In order for the gate-driver circuit to turn OFF such P-channel power-FETs, in some embodiments the gate-driver circuit may determine the voltage on the source of the power-FET and then apply this determined voltage to the power-FET's gate. In other embodiments, the gate-driver circuit may be configured to operate with an external resistor that is coupled between the gate and the source (or, the gate and the drain) of the P-channel power-FET, where the gate-driver circuit is configured cease driving (e.g., to float) the power-FET's gate which causes the external resistor to pull-up the gate voltage to the voltage at the power-FET's source.

Figure 5:
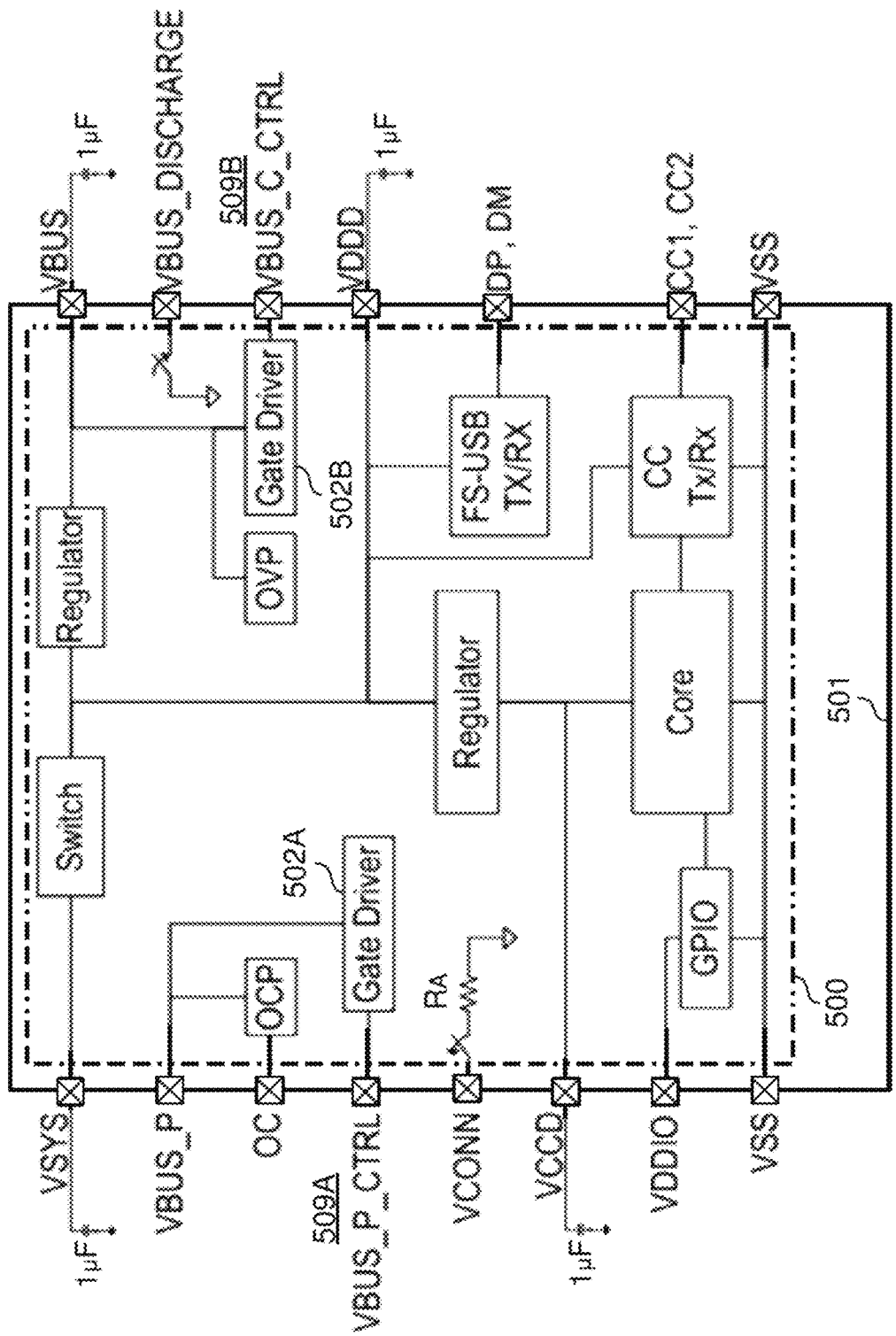
FIG. 5 illustrates an example IC controller with configurable/programmable integrated gate-driver circuit(s), in accordance with some embodiments.

FIG. 5 illustrates an example IC controller 500 with configurable/programmable integrated gate-driver circuit(s), in accordance with the techniques described herein. In the embodiment illustrated in FIG. 5, IC controller 500 is disposed in chip package 501 and includes a USB Type-C subsystem. Among other USB Type-C components, IC controller 500 includes two gate drivers 502A and 502B that are each configured to selectively control a power path with N-channel power-FET(s) or a power path with P-channel power-FET(s). The output of gate driver 502A is coupled to pin 509A ("VBUS_P_CTRL") on package 501, and the output of gate driver 502B is coupled to pin 509B ("VBUS_C_CTRL") on package 501.

In accordance with the techniques described herein, each of gate drivers 502A and 502B is configured to determine/select whether to control a power path with N-channel power-FET(s) or a power path with P-channel power-FET(s). In one example embodiment, IC controller 500 may be disposed in a mobile device that includes both a provider power path to provide power (e.g., to an external peripheral device) through a USB Type-C interface and a consumer power path to receive power (e.g., to charge its batteries) through the USB Type-C interface. For instance, the provider power path may include N-channel power-FETs disposed on a first VBUS line of the USB Type-C interface, and the consumer power path may include P-channel power-FETs disposed on a second VBUS line of the USB Type-C interface. In this example embodiment, gate driver 502A is coupled to control the N-channel power-FETs on the provider power path and gate driver 502B is coupled to control the P-channel power-FETs on the consumer power path, in accordance with the techniques described herein. For example, gate driver 502A may turn ON the N-channel power-FETs of the provider power path by applying a suitable positive voltage on the power-FETs' gates as described heretofore, and may turn OFF these N-channel power-FETs by applying a substantially 0V voltage to their gates. On the other hand, gate driver 502B may turn ON the P-channel power-FETs of the consumer power path by applying a substantially 0V voltage on the power-FETs' gates, and may turn OFF these P-channel power-FETs by driving a high impedance on the power-FETs' gates as described heretofore.

Figure 6:
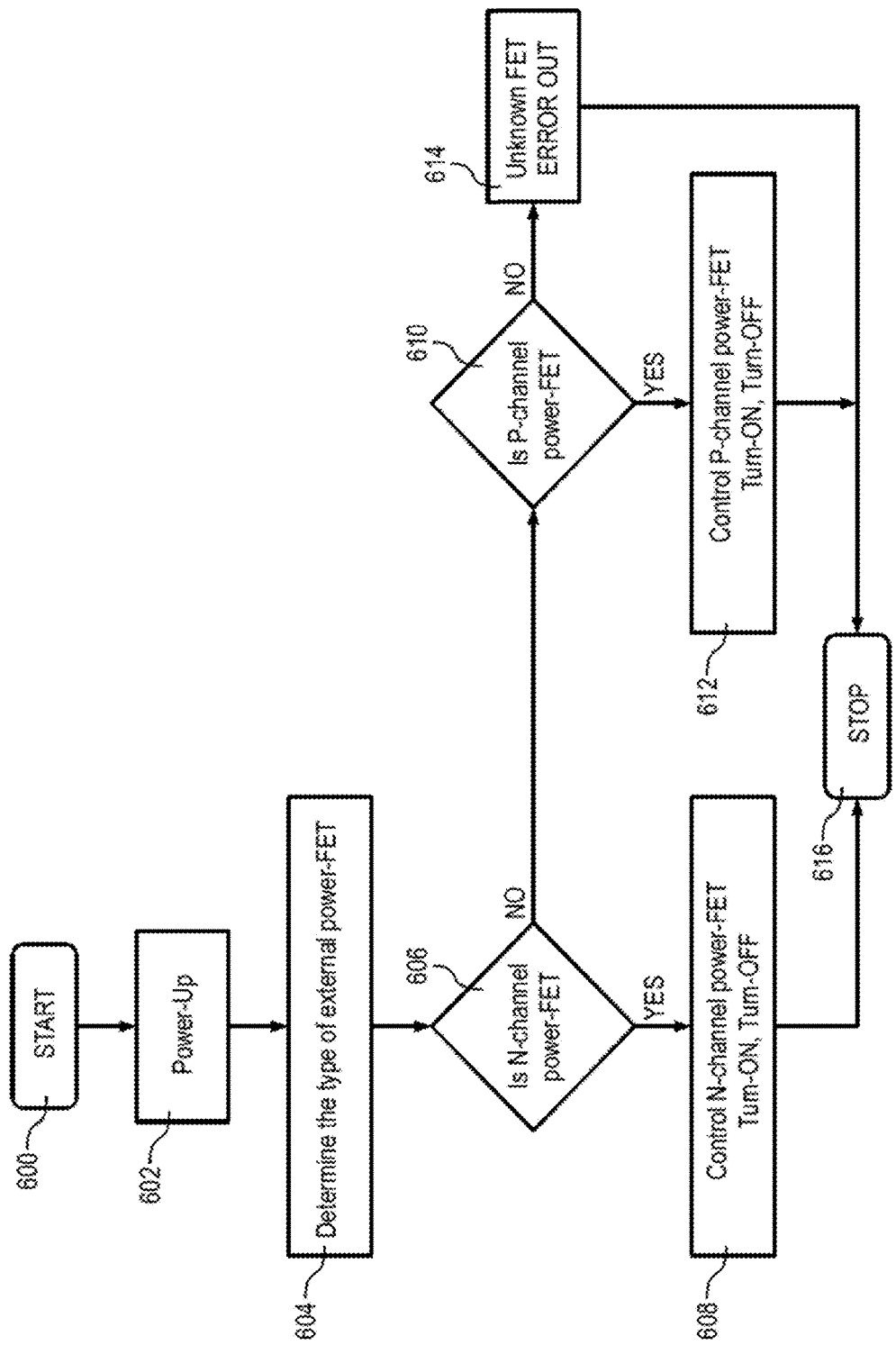
FIG. 6 illustrates an example method for operating power-FET(s), in accordance with some embodiments.

FIG. 6 illustrates an example method for operating power-FETs, in accordance with the techniques described herein. The operations of the method in FIG. 6 are described as being performed by a controller (e.g., a single-chip IC USB controller) and/or a gate-driver circuit (e.g., in a USB Type-C subsystem) thereof, in accordance with an example embodiment. It is noted, however, that various implementations and embodiments may use various, and possibly different, components to perform the operations of the method in FIG. 6. For example, in various embodiments a system-on-chip (SoC) device may be configured with firmware instructions which, when executed by one or more processors or other hardware components (e.g., microcontrollers, ASICs, and the like), are operable to perform the operations of the method in FIG. 6. Thus, the description hereinafter, of the method in FIG. 6 as being performed by a controller and/or a gate-driver circuit thereof, is to be regarded in an illustrative rather than a restrictive sense.

The method starts with start-up operation 600. In operation 602, a controller (and/or a USB Type-C subsystem thereof) is powered up. As part of or after the power-up operation, the controller may perform various boot-up and initialization operations based on code, data, and other information stored in firmware, software, and/or hardware registers.

In operation 604, the controller determines the types of any power-FETs that are coupled in power paths which the controller is configured to control. In various embodiments, the controller may determine the types of the power-FETs in various ways. For example, in some embodiments the controller may detect the logic value provided on a pre-assigned general purpose I/O (GPIO) pin, where a certain pre-determined value (e.g., a logic "0") may be configured to indicate a power path with a P-channel power-FET and a different pre-determined value (e.g., a logic "1") may be configured to indicate a power path with an N-channel power-FET. In other embodiments, the controller may be configured to read and/or upload one or more firmware settings that are configured to indicate the types of power-FETs that are disposed on each power path coupled for control by the controller. In yet other embodiments, the controller may use voltage detectors to detect the voltages on the gate-drivers' outputs in order to determine the types of power-FETs coupled to these outputs. For example, in these embodiments the controller may perform operation 604, and use the voltage detectors to determine the type of the power-FETs coupled on a given power path, when a power-transfer voltage "vpwr_in" is present and/or is detected on this power path.

In operation 606, the controller determines whether the power-FET detected on the power path is an N-channel power-FET. If in operation 606 the controller determines that detected power-FET is not an N-channel power-FET, the controller continues with operation 610. If in operation 606 the controller determines that the detected power-FET is an N-channel power-FET, then the controller continues with operation 608 to control the operation of the detected N-channel power-FET.

In operation 608, the controller operates a gate-driver circuit therein to control the N-channel power-FET in accordance with the techniques herein as described heretofore. For example, to turn ON the N-channel power-FET, the controller operates and causes the gate-driver circuit to apply to the power-FET's gate an output voltage that is higher than the sum of the power-transfer voltage "vpwr_in" of the power path and the threshold voltage of the N-channel power-FET (i.e., output voltage>=vpwr_in+Vth). To maintain the N-channel power-FET in the ON state, the controller operates and causes the gate-driver circuit to continue applying the output voltage to the power-FET's gate. To turn OFF the N-channel power-FET, the controller operates and causes the gate-driver circuit to apply to the power-FET's gate an output voltage of substantially 0V (e.g., by grounding the power-FET's gate). The controller may continue performing operation 608 in this manner until certain conditions are met and/or until a certain event is detected (e.g., while the power-transfer voltage "vpwr_in" is being detected on the power path and/or until the controller is powered down). When operation 608 does not need to be performed any longer, the controller may continue with other operations or stop the method in operation 616.

In operation 610, the controller determines whether the power-FET detected on the power path is a P-channel power-FET. If in operation 610 the controller determines that detected power-FET is not a P-channel power-FET, the controller continues with operation 614. In operation 614, the controller outputs (or otherwise records) an error indicating that an unknown power-FET type was detected, and the method is stopped thereafter in operation 616. If in operation 610 the controller determines that the detected power-FET is a P-channel power-FET, then the controller continues with operation 612 to control the operation of the detected P-channel power-FET.

In operation 612, the controller operates the gate-driver circuit therein (i.e., the same gate-driver circuit as in operation 608) to control the P-channel power-FET in accordance with the techniques herein as described heretofore. To turn OFF the P-channel power-FET, the controller operates and causes the gate-driver circuit to apply high impedance to the power-FET's gate, which causes an external resistor coupled to the power path to pull-up the gate voltage of the power-FET to the power-transfer voltage "vpwr_in" of the power path. To turn ON the P-channel power-FET, the controller operates and causes the gate-driver circuit to provide an output voltage of substantially 0V (e.g., by grounding the power-FET's gate). This causes the voltage division between the external resistor and the gate-driver circuit's pull-down to produce a gate voltage that is lower than or equal to the difference between the power-transfer voltage "vpwr_in" and the threshold voltage of the P-channel power-FET (i.e., output/gate voltage<=vpwr_in−Vth). To maintain the P-channel power-FET in the ON state, the controller operates and causes the gate-driver circuit to continue pulling down the gate voltage of the power-FET in the above manner. The controller may continue performing operation 612 until certain conditions are met and/or until a certain event is detected (e.g., while the power-transfer voltage "vpwr_in" is being detected on the power path and/or until the controller is powered down). When operation 612 does not need to be performed any longer, the controller may continue with other operations or stop the method in operation 616.

Figure 7:
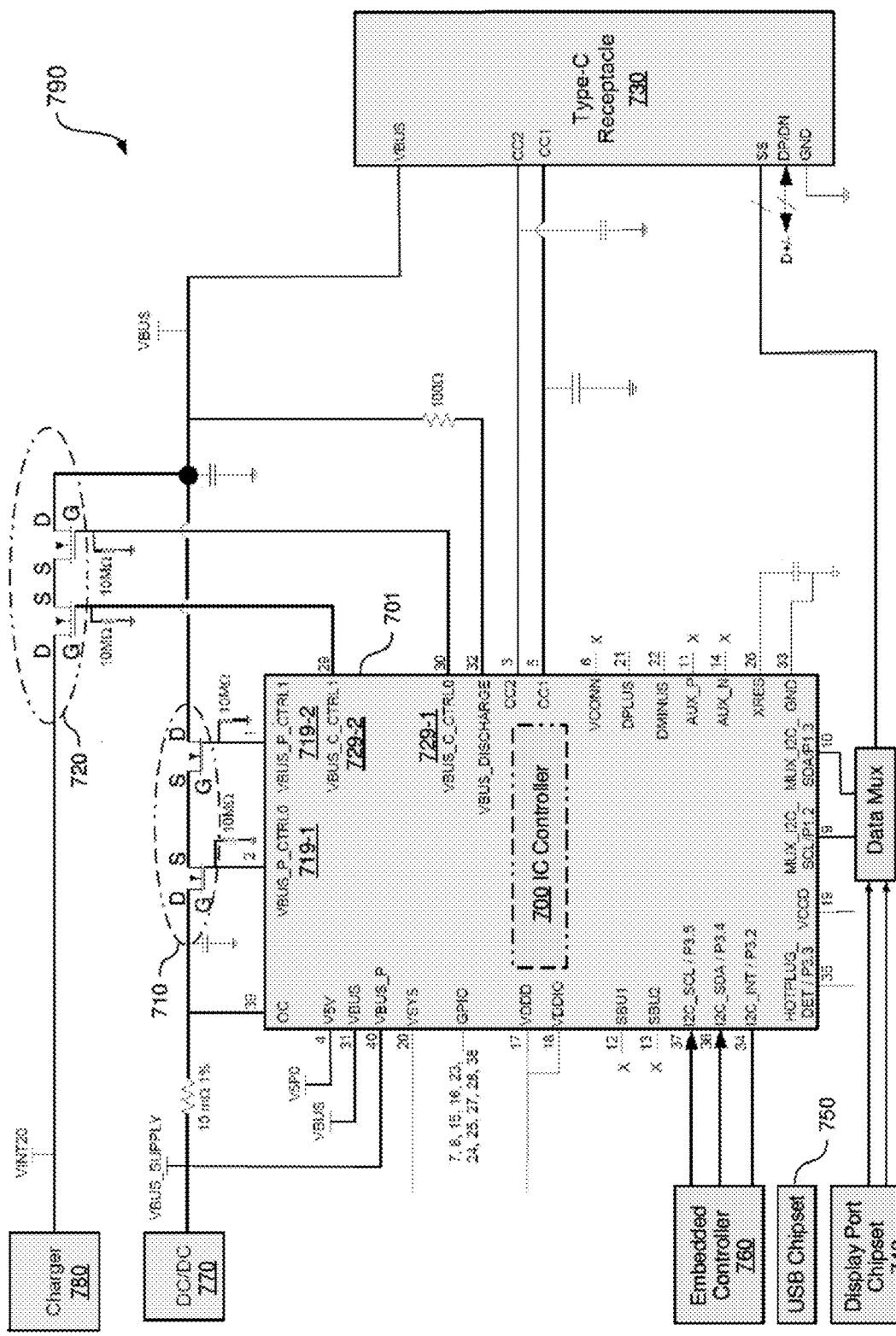
FIG. 7 illustrates an example system in accordance with some embodiments.

The techniques for power-FET gate-driver circuits described herein may be embodied in several different types of USB Type-C applications. Examples of such types of Type-C applications include, but may not be limited to: a downstream facing port (DFP) USB application, in which an IC controller with a USB Type-C subsystem is configured to provide a downstream-facing USB port (e.g., in a USB-enabled host device); an upstream facing port (UFP) USB application, in which an IC controller with a USB Type-C subsystem is configured to provide an upstream-facing USB port (e.g., in a USB-enabled peripheral device or adapter); and a dual role port (DRP) USB application, in which an IC controller with a USB Type-C subsystem is configured to support both DFP and UFP applications on the same USB port;

FIG. 7 illustrates an example system 790 in which IC controller 700 with a USB Type-C subsystem and a USB-PD subsystem is configured to provide a DRP application. In an example embodiment, IC controller 700 may be a single-chip IC device from the family of CCGx USB controllers developed by Cypress Semiconductor Corporation, San Jose, Calif. In system 790, IC controller 700 is coupled to Type-C receptacle 730, to display port chipset 740, to USB chipset 750, to embedded controller 760, to power supply 770, and to charger 780. These components of system 790 may be disposed on a printed circuit board (PCB) or other suitable substrate, and are coupled to each other by suitable means such conductive lines, traces, buses, etc.

Type-C receptacle 730 is configured in accordance with a USB Type-C specification to provide connectivity through a Type-C port. Display port chipset 740 is configured to provide a DipslayPort functionality through the Type-C receptacle 730. USB chipset 750 is configured to provide support for USB communications (e.g., such as USB 2.0 communications) through the D+/− lines of Type-C receptacle 730. Embedded controller 760 is coupled to IC controller 700 and is configured to provide various control and/or data transfer functions in system 790. Power supply 770 is a DC/DC power source that is coupled to provider power path 710. Provider power path 710 includes N-channel power-FETs that are coupled to independently-controlled gate-driver outputs 719-1 ("VBUS_P_CTRL0") and 719-2 ("VBUS_P_CTRL1") of IC controller 700. Provider power path 710 is configured to transfer power from power supply 770 through Type-C receptacle 730 to an external power-consuming device (e.g., such as a peripheral device). Charger 780 is a battery charger that is coupled to consumer power path 720 and is configured to charge the batteries in system 790. Consumer power path 720 includes N-channel power-FETs that are coupled to independently-controlled gate-driver outputs 729-1 ("VBUS_C_CTRL0") and 729-2 ("VBUS_C_CTRL1") of IC controller 700. Consumer power path 720 is configured to receive power through Type-C receptacle 730 and to transfer the power to charger 780.

Along with providing the DRP USB functionality in system 790, IC controller 700 is configured to operate and control external power paths 710 and 720 in accordance with the techniques described herein. For example, upon power-up IC controller 700 is configured to determine that the power-FETs coupled in power paths 710 and 720 are N-channel power-FETs. When a power-transfer voltage is provided and/or detected on anyone or both of power paths 710 and 720, IC controller 700 is configured to operate the gate drivers (not shown in FIG. 7) that are coupled to power paths 710 and 720 through gate-driver outputs 719-1/719-2 and 729-1/729-2, respectively. To turn ON the N-channel power-FETs in power path 710, IC controller 700 operates the respective gate driver to independently control outputs 719-1/719-2 and to provide thereto output voltages that are higher than the sum of the power-transfer voltage of the power path and the threshold voltage of the N-channel power-FETs (i.e., output voltage>=vpwr_in+Vth). To turn OFF the N-channel power-FETs in power path 710, IC controller 700 operates the gate driver to independently control outputs 719-1/719-2 and to provide thereto output voltages of substantially 0V that are applied to the power-FETs' gates. IC controller 700 is configured to control power path 720 in a similar manner. To turn ON the N-channel power-FETs in power path 720, IC controller 700 operates the respective gate driver to independently control outputs 729-1/729-2 and to provide thereto output voltages that are higher than the sum of the power-transfer voltage of the power path and the threshold voltage of the N-channel power-FETs (i.e., output voltage>=vpwr_in+Vth). To turn OFF the N-channel power-FETs in power path 720, IC controller 700 operates the gate driver to independently control outputs 729-1/729-2 and to provide thereto output voltages of substantially 0V that are applied to the power-FETs' gates.

Figure 8:
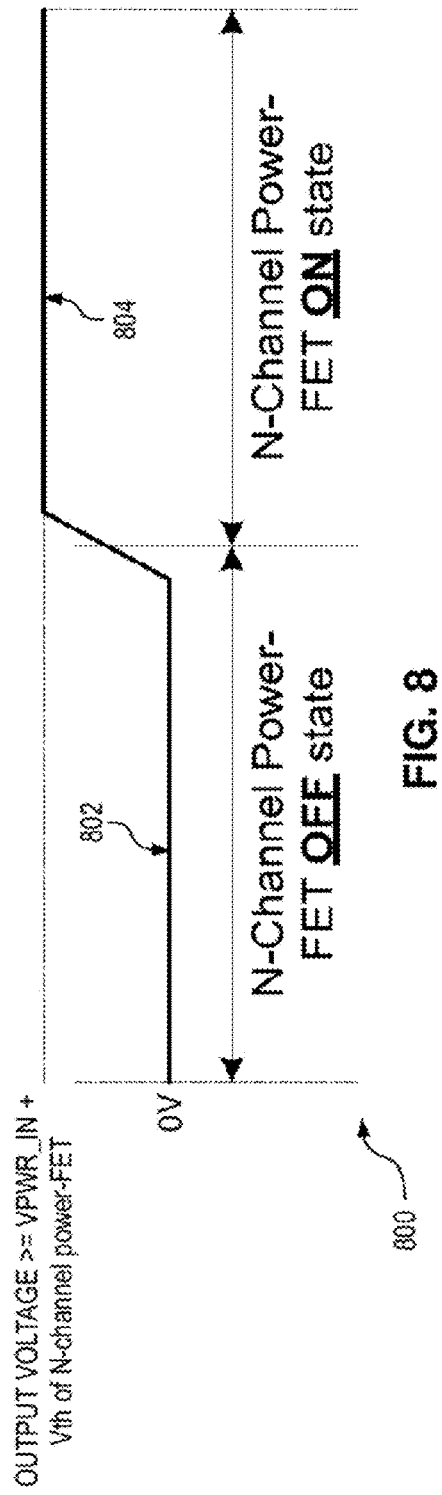
FIG. 8 illustrates a diagram with voltage waveforms of a gate-driver output signal for control of N-channel power-FET(s), according to an example embodiment.
Figure 9:
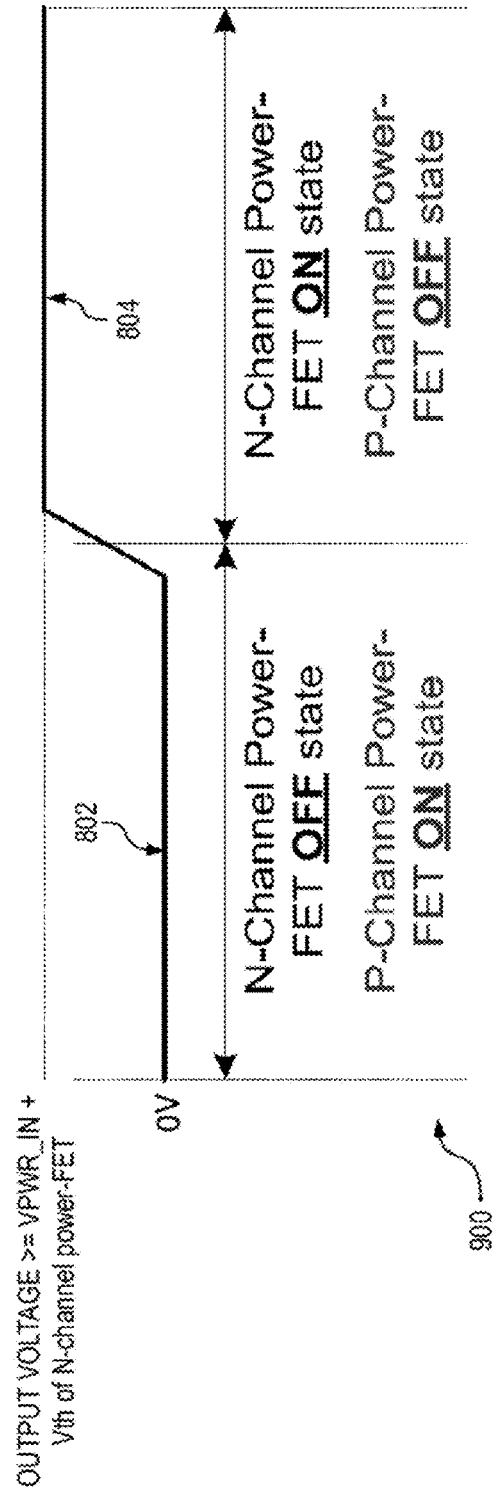
FIG. 9 illustrates a diagram with voltage waveforms of the gate-driver output signal for control of P-channel power-FET(s), according to the embodiment in FIG. 8.

FIGS. 8 and 9 illustrate voltage diagrams of control signals that can be applied by the same gate-driver circuit to control an N-channel power-FET and a P-channel power-FET, respectively, in accordance with alternative embodiments that provide two voltage states for the driver outputs.

FIG. 8 illustrates the voltage waveform of a control signal driven by a gate-driver circuit to the gate of an N-channel power-FET. In order to pass a power-transfer voltage "vpwr_in" through the N-channel power-FET, the gate-driver circuit needs to drive an output voltage that is higher than the sum of the power-transfer voltage and the threshold voltage of the N-channel power-FET, i.e., $$\text{output voltage} >= vpwr\_in + Vth$$

where Vth is the threshold voltage of the N-channel power-FET. To turn OFF the N-channel power-FET, the gate-driver circuit may provide an output voltage of substantially 0V. Operation of the gate-driver circuit for the N-channel power-FET is illustrated in voltage diagram 800 in FIG. 8. Voltage diagram 800 illustrates that an N-channel power-FET is in the OFF state when the gate-driver output signal has an output voltage 802 (e.g., such as 0V), and that the N-channel power-FET is in the ON state when the gate-driver output signal has an output voltage 804 that is higher than or equal to the "vpwr_in" voltage plus the Vth voltage of the power-FET.

The gate-driver circuit, which operates according to the voltages illustrated in FIG. 8, can be re-purposed (e.g., through determine/select operations performed by firmware) to drive a P-channel power-FET as shown in FIG. 9. Voltage diagram 900 illustrates that the P-channel power-FET is in the ON state when the gate-driver output signal has an output voltage 802 (e.g., such as 0V), and that the P-channel power-FET is in the OFF state when the gate-driver output signal causes an output voltage 804 that is higher than or equal to the "vpwr_in" voltage plus the Vth voltage (i.e., output voltage >=vpwr_in+Vth). In this manner, the same gate-driver circuit can operate both N-channel power-FETs and P-channel power-FETs with only two states of the driver output signals. However, it is noted that this solution consumes more power than the power needed to control a P-channel power-FET in a solution that uses three states (e.g., positive threshold state, zero-voltage state, and high-impedance state) for the driver output signal.

Various embodiments of the techniques for power-FET gate-driver circuits described herein may include various operations. These operations may be performed and/or controlled by hardware components, digital hardware and/or firmware, and/or combinations thereof. As used herein, the term "coupled to" may mean connected directly or indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for power-FET gate-driver circuits described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) herein are shown and described in a particular order, in some embodiments the order of the operations of each circuit may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A system comprising:
   a first power path comprising an N-channel power-Field Effect Transistor (power-FET);
   a second power path comprising a P-channel power-FET;

an integrated circuit (IC) controller coupled to control the first power path and the second power path, wherein the first power path and the second power path are external to the IC controller, and wherein the IC controller is configured at least to:
- in a first state, operate to turn and maintain ON the N-channel power-FET;
- in a second state, operate to turn OFF the N-channel power-FET and to turn and maintain ON the P-channel power-FET; and
- in a third state, operate to turn OFF the P-channel power-FET.

2. The system of claim 1, wherein the system is Universal Serial Bus (USB)-enabled.

3. The system of claim 2, wherein the system is a laptop computer.

4. The system of claim 2, wherein the system is a monitor.

5. The system of claim 2, wherein the system is a hub.

6. The system of claim 2, wherein the system is a wall charger.

7. The system of claim 2, wherein the system is a smartphone or a tablet.

* * * * *